(12) United States Patent
Peng et al.

(10) Patent No.: US 8,933,915 B2
(45) Date of Patent: Jan. 13, 2015

(54) INTEGRATED CIRCUIT FOR DISPLAY APPARATUS AND METHOD THEREOF

(75) Inventors: Hsi-Chieh Peng, Taoyuan County (TW); Cheng Lo, Taoyuan County (TW); Jih-Hsin Huang, Taoyuan County (TW); Hsi-Cheng Yeh, Taoyuan County (TW); Chia-Chu Ho, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 250 days.

(21) Appl. No.: 13/584,088

(22) Filed: Aug. 13, 2012

(65) Prior Publication Data

US 2013/0106872 A1 May 2, 2013

Related U.S. Application Data

(60) Provisional application No. 61/551,763, filed on Oct. 26, 2011.

(51) Int. Cl.
*G06F 3/038* (2013.01)
*G09G 5/36* (2006.01)
(Continued)

(52) U.S. Cl.
CPC ............. *G09G 3/20* (2013.01); *G06F 3/1415* (2013.01); *G09G 2320/103* (2013.01); *G09G 2330/021* (2013.01); *G09G 2340/0435* (2013.01); *G09G 2360/18* (2013.01)
USPC .............. 345/204; 345/545; 345/98; 345/99

(58) Field of Classification Search
CPC ....... G09G 5/39; G09G 5/395; G09G 3/2092; G09G 3/3648; G09G 2320/103; G09G 2360/18
See application file for complete search history.

(56) References Cited

U.S. PATENT DOCUMENTS

| 5,812,149 A | * | 9/1998 | Kawasaki et al. | ............... 345/98 |
| 6,909,434 B2 | * | 6/2005 | Takala et al. | .................. 345/537 |

(Continued)

FOREIGN PATENT DOCUMENTS

| CN | 1787060 A | 6/2006 |
| CN | 101322094 A | 12/2008 |

(Continued)

OTHER PUBLICATIONS

Choi et al., "Low-power color TFT LCD display for hand-held embedded systems." Low Power Electronics and Design, 2002. ISLPED '02. Proceedings of the 2002 International Symposium on, pp. 112-117. IEEE, 2002.*

*Primary Examiner* — Maurice L McDowell, Jr.
*Assistant Examiner* — Donna J Ricks
(74) *Attorney, Agent, or Firm* — Birch, Stewart, Kolasch & Birch, LLP

(57) ABSTRACT

A display apparatus, an integrated circuit and method thereof are disclosed. The display apparatus includes a frame buffer, a controller circuit, and a display driver circuit. The frame buffer is configured to retain a plurality of image frames to be displayed. The controller circuit, coupled to the frame buffer, is configured to determine whether a change in the image frames has occurred and whether a refresh time is expired. The display driver circuit, operatively coupled to the frame buffer and adapted to couple to an active display device, is configured to receive the image frames to be displayed from the frame buffer and dynamically refreshing the active display device when the change is determined or when a refresh time is expired.

22 Claims, 5 Drawing Sheets

(51) Int. Cl.
*G09G 3/36* (2006.01)
*G09G 3/20* (2006.01)
*G06F 3/14* (2006.01)

(56) References Cited

U.S. PATENT DOCUMENTS

| | | | |
|---|---|---|---|
| 7,893,933 B2 * | 2/2011 | Yi et al. | 345/211 |
| 2007/0002036 A1 * | 1/2007 | Kardach et al. | 345/213 |
| 2007/0195040 A1 * | 8/2007 | Park et al. | 345/89 |
| 2007/0230569 A1 * | 10/2007 | Itoh et al. | 375/240.01 |
| 2007/0273682 A1 | 11/2007 | Yi et al. | |
| 2011/0063312 A1 * | 3/2011 | Hong | 345/530 |
| 2011/0205481 A1 * | 8/2011 | Aruga et al. | 349/151 |

FOREIGN PATENT DOCUMENTS

| | | | | |
|---|---|---|---|---|
| EP | 1560194 A2 | 8/2005 | | |
| TW | 200744059 A | 12/2007 | | |
| WO | WO2006003681 | * | 1/2006 | H04M 1/725 |
| WO | WO 2007/112021 A2 | 10/2007 | | |

* cited by examiner

INTEGRATED CIRCUIT FOR DISPLAY APPARATUS AND METHOD THEREOF

CROSS REFERENCE TO RELATED APPLICATIONS

This Application claims priority of U.S. Provisional Application No. 61/551,763, filed on 26 Oct. 2011, and the entirety of which is incorporated by reference herein.

BACKGROUND OF THE INVENTION

1. Field of the Invention

The present invention relates to display devices, and in particular relates to an integrated circuit for a display apparatus and a method thereof.

2. Description of the Related Art

Power saving is one primary objective of electronics design. Particularly for a mobile application, power saving is important due to the limited power storage. The display and graphics card may consume a considerable portion of the total power consumption of any electronic device.

In general, a display apparatus employs a display controller to generate data at a predetermined refresh rate supported by the display apparatus. As technology advances, new display types are now capable of supporting a refresh rate slower than an update rate of the image data.

BRIEF SUMMARY OF THE INVENTION

In one aspect of the invention, a display apparatus is disclosed, comprising a frame buffer, a controller circuit, and a display driver circuit. The frame buffer is configured to retain a plurality of image frames to be displayed. The controller circuit, coupled to the frame buffer, is configured to determine whether a change in the image frames has occurred and whether a refresh time is expired. The display driver circuit, operatively coupled to the frame buffer and adapted to couple to an active display device, is configured to receive the image frames to be displayed from the frame buffer and dynamically refreshing the active display device when the change is determined or when a refresh time is expired.

In yet another aspect of the invention, an integrated circuit is described, comprising a frame buffer and a controller. The frame buffer is configured to retain a first image data and a second image data. The controller, coupled to the frame buffer and the transceiver, is configured to determine whether a second image data is received and whether a refresh time is expired. The transceiver is further configured to transmit the second image data to the display device when the second image data is received and transmit the first image data to the display device when the refresh time is expired.

In yet another aspect of the invention, a method performed by an integrated circuit is revealed, comprising: retaining a plurality of image frames to be displayed in a frame buffer; determining whether a change in a pair of image frames to be display consequently has occurred; counting a refresh time; and dynamically refreshing the active display device when the change is determined or when the refresh time is expired.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
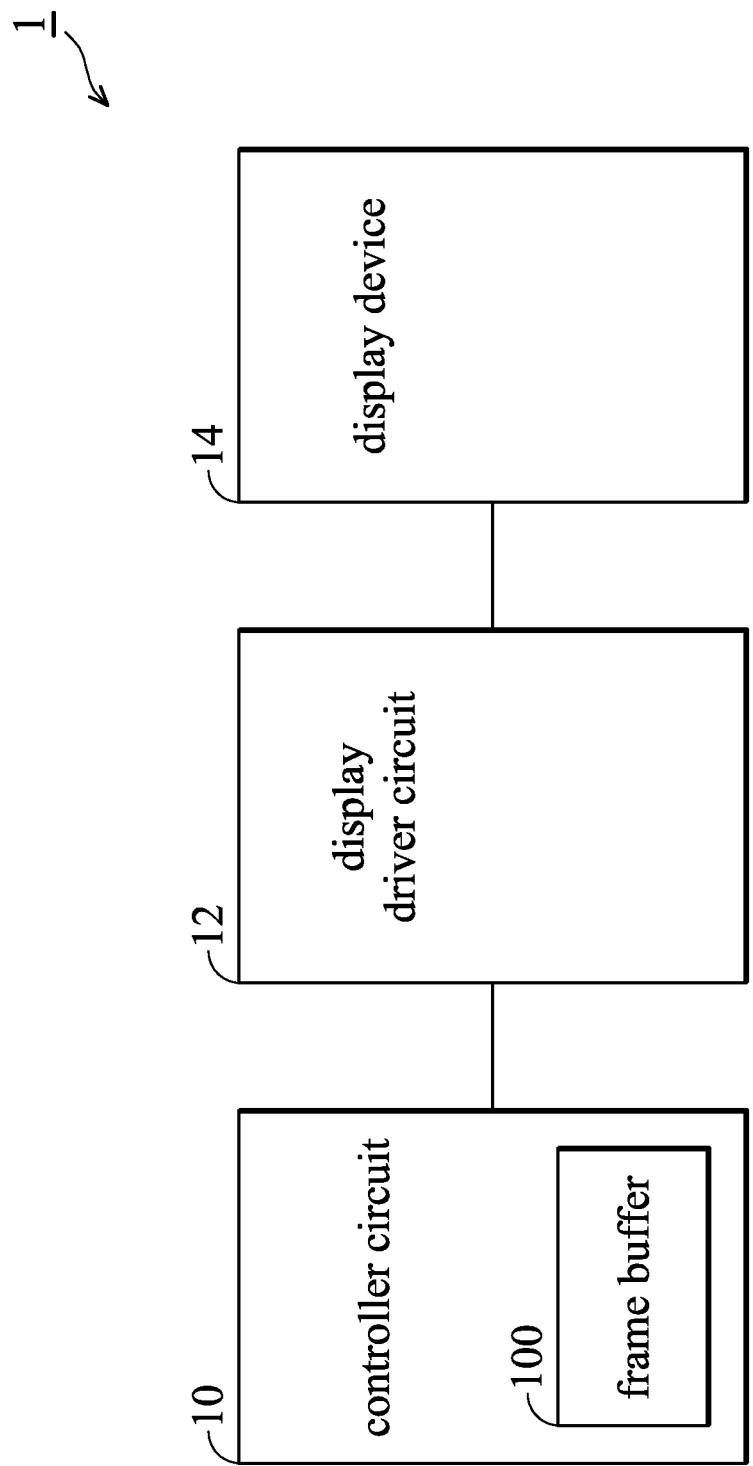
FIG. 1 is a block diagram of a conventional display apparatus 1.

FIG. 1 is a block diagram of a conventional display apparatus 1 comprising a controller circuit 10, a display driver circuit 12, and an LCD display 14. The controller circuit 10 downloads and stores image frame data $D_i$ from external data sources to a frame buffer 100. The frame buffer 100 is a memory space that is allocated to maintain the image frame and to be accessed by a display driver IC 12 to display the image frame on an LCD display 14. The image frames may be written onto the frame buffer 100 at a frame rate, which is determined by a number of image frames that are written into the frame buffer 100 per second. In the conventional approach, the LCD display 14 is refreshed at a refresh rate exceeding a minimum limit in order to prevent flicker occurrence on the display 14 due to TFT (Thin-Film-Transistor) current leakage. Typically, the display refresh rate is 60 Hz. The controller circuit 10 moves image data $D_i$ from the frame buffer 100 to the display driver 12 at a fixed refresh rate, irrespective of the image frame rate. The refresh rate may be different from the frame rate. For example, the image frame is sent to the frame buffer 100 at a frame rate of 30 Hz and the image is refreshed on the LCD display 14 at a refresh rate of 60 Hz. In some implementations, the display driver circuit 12 also comprises a frame buffer (not shown) to keep the received image frame before refreshing image data on the LCD display 14. In all cases the display driver IC 12 updates an image frame to the LCD display 14 by the refresh rate, regardless of the frame rate.

Figure 2:
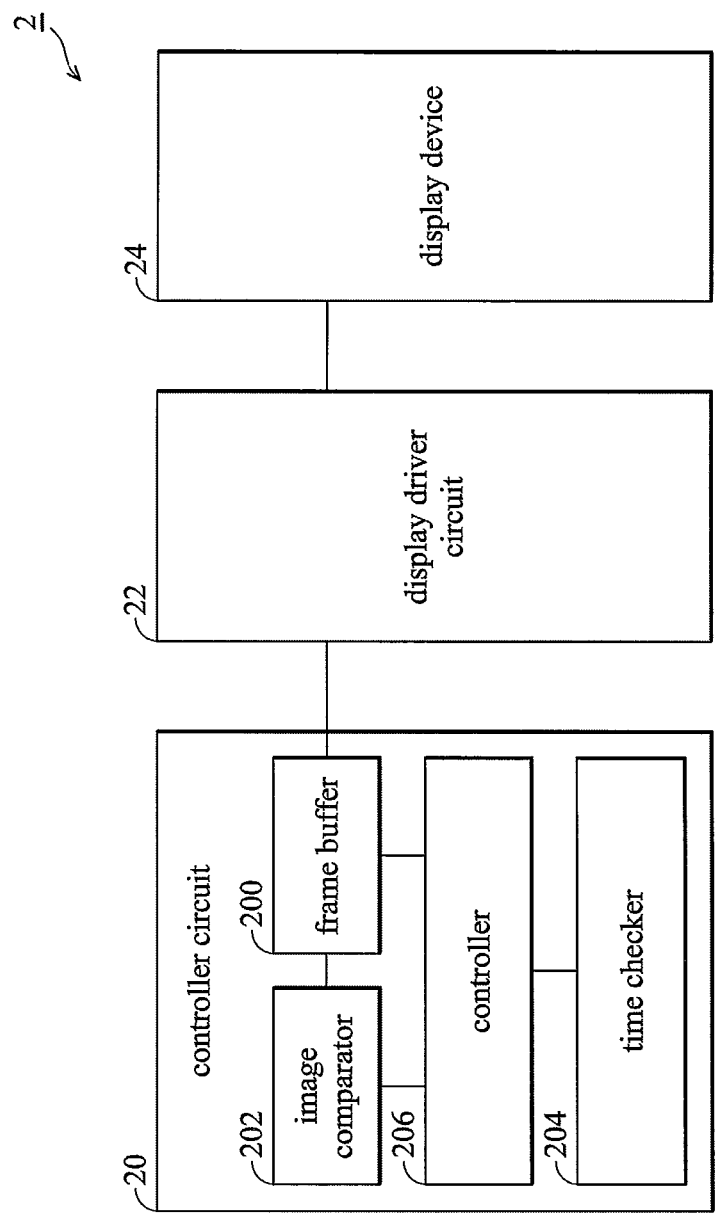
FIG. 2 is a block diagram of an exemplary display apparatus 2 according to an embodiment of the invention.

FIG. 2 is a block diagram of an exemplary display apparatus 2 according to an embodiment of the invention, comprising a controller circuit 20, a display driver circuit 22, and a display device 24. The controller circuit 20 and the display driver circuit 22 can be integrated as a part of an integrated circuit for a communication or personal computing system, or can be made up by discrete components in a discrete circuit. The configuration of the controller circuit 20 and the display driver circuit 22 can be established through programmable options for display type, resolution, pixel depth, display refresh rate, and output data formats. The controller circuit 20 transfers frame data $D_i$ to the display driver circuit 22 at a dynamic refresh rate determined by a frame rate or a display refresh rate. The frame rate is defined by a number of times per second in which an image frame is being transferred to the controller circuit 20. The display refresh rate is defined by a number of times per second in which a display image is being refreshed on the display device 24. The display driver circuit 22 is further coupled to a display device 24, and refreshes images on a screen (not shown) of the display device 24 at the refresh rate.

It has been difficult to decrease the image refresh rate because of image flicker due to TFT leakage current. As multimedia display technology advances, the refresh rate of a display device 24 may be reduced to 1 Hz or lower, i.e., the display driver IC 12 can drive the display device at the refresh rate as low as 1 image frame per second.

The controller circuit 20 comprises a frame buffer 200, an image comparator 202, a time checker 204, and a controller

206. The controller 206 controls the operations of the frame buffer 200, the image comparator 202, and the time checker 204. The frame buffer 200 may comprise single or multiple buffers. In the single-buffer system, the frame buffer 200 contains a partially downloaded frame, wherein a remaining portion of a previous frame is overwritten. In the double-buffer systems, the frame buffer 200 employs two buffers to reduce overwriting of the frame data. Newly downloaded frames are rendered in a second buffer while the previous frame is in a first buffer. The two buffers are swapped when the new frame transmission is completed so that the new frame can be refreshed and displayed on the display device. The image comparator 202 receives and compares the new frame $D_{i\_new}$ and the previous frame data $D_{i\_pre}$ from the frame buffer 200 to determine any differences therebetween. In some implementations, the image comparator 202 receives partial new frame data $D_{i\_new}'$ as soon as the partial new frame data $D_{i\_new}'$ is written into the frame buffer 200 and makes a partial comparison for the partial new data $D_{i\_new}'$ and the previous frame data $D_{i\_pre}$ accordingly. In other implementations, the image comparator 202 receives a predetermined size of partial new frame data $D_{i\_new}'$ at a predetermined? time to make a partial comparison with the previous frame data $D_{\_pre}$. In yet other implementations, the image comparator 202 receives the complete new frame data $D_{i\_new}$ and makes a complete comparison between the complete new frame data $D_{i\_new}$ and the previous frame data $D_{i\_pre}$. The image comparator 202 may temporarily keep the complete new frame data $D_{i\_new}$ in a local data buffer as the previous frame after the image comparison is finished. The image comparator 202 may signify the detection as soon as a difference is detected, or after the comparison has been performed for all data in the new frame data and the previous frame data. The controller circuit 20 may receive information on the minimum display refresh rate of the display device 24, when it is set by a manufacturer or during a startup setup procedure. The time checker 204 may be realized by a timer or a counter, timing or counting a predetermined display refresh time. The predetermined display refresh time is selected such that it is less than an inverse value of the minimum display refresh rate. The controller 206 loads the new frame data $D_{i\_new}$ from sources such as the operating system, application programs, internet, local area network or an external data storage such as a flash memory or disk drive to the frame buffer 200. The controller circuit 20 can provide image data to the display driver circuit 22 in response to an instruction from the comparator 202. The comparator 202 can determine whether a change in the image frame has occurred and send out the instruction indicating that the change has occurred. That is, the controller circuit 20 can determine whether the received frame data is new according to the image difference detection result from the image comparator 202, determine whether the predetermined display refresh time has been reached, and send the new frame data $D_{i\_new}$ to the display driver circuit 22 when a new frame data has been received or when the predetermined refresh time has been reached.

The display device 24 can be any type of video display, particularly, all types of active displays with a TFT structure like TFT-LCDs and AMOLEDs. The active displays include a liquid crystal display (LCD), Light emitting diode display (LED), Thin film transistor liquid crystal display (TFT-LCD), Electroluminescent display (ELD), Plasma display panel (PDP), Liquid crystal on silicon (LCoS) display, Organic light-emitting diode (OLED) display, Organic light-emitting transistor (OLET) display, Surface-conduction electron-emitter display (SED) display, Field emission display (FED) display, Laser TV display, MEMS display, Quantum dot display (QD-LED), Ferro liquid display (FLD), Thick-film dielectric electroluminescent (TDEL), Telescopic pixel display (TPD), or Laser phosphor display (LPD).

In some implementations, the controller circuit 20 is implemented by an integrated circuit, and may be, for example, a microcontroller for a mobile phone or a processor for a laptop computer. The frame buffer 200 is configured to receive and retain a first image data and a second image data from the internal data storage and external network, where the first image data is from the previous image frame and the second image data is from the current image frame. In some implementations, the controller 206 may send a request message to the external network to request for the first or the second image data. The controller circuit 20 may comprises a transceiver (not shown) that is coupled to the display driver circuit 22 and configured to transmit the first and the second image data to the display device via the display driver circuit 22. The controller 206 is coupled to the frame buffer 200 and the transceiver and configured to determine whether a second image data has been received and whether a refresh time is expired. The transceiver is configured to transmit the second image data to the display device 24 when the second image data has been received and transmit the first image data to the display device 24 when the refresh time is expired, thereby supplying the display device 24 with a timely and stable image signal.

The controller circuit 20 comprises the image comparator 202 acquiring image data from the frame buffer 200 to compare the second image data with the first one. The comparison result may be outputted to the controller 206 for determining whether a new image data has been received. For example, the first and the second image may be image frames with the same pixel dimension m×n, where m and n are the number of pixels of the image frame along the x-axis and y-axis dimension. The image comparator 202 compares corresponding pixels in the first and second image data and prompts a difference signal to the controller 26 upon detecting a difference therebetween. In other examples, the comparator 202 outputs a comparison result indicating one or more differences between the first and second image data. The realization of data comparison for the first and second image data is up to the actual implementation, so long as the controller 206 can distinguish the second image data as an updated image, allowing the transceiver to update the updated second image data to the display device 24 whenever the new image is available.

The controller circuit 20 comprises the time checker 204 (a timer or a counter) configured to count the refresh time. In some implementations, the refresh time is configurable by the controller 206 according to the supported refresh rates of the display device 24. The time checker 204 counts the refresh time, either by incrementing or decrementing at a fixed frequency clock (not shown) to establish a measure of the refresh time. Upon the refresh time being expired, the controller circuit 20 refreshes image data displayed on the display device 24 by retransmitting the first image data to the display device 24 via the display driver circuit 22. The controller 206 may reset the time checker 204 after the refresh time is expired.

The display apparatus 2 refreshes the display device according to a display refresh rate or new frame data determination, thereby providing a dynamic frame refresh mechanism for the display device 24.

Figure 3:
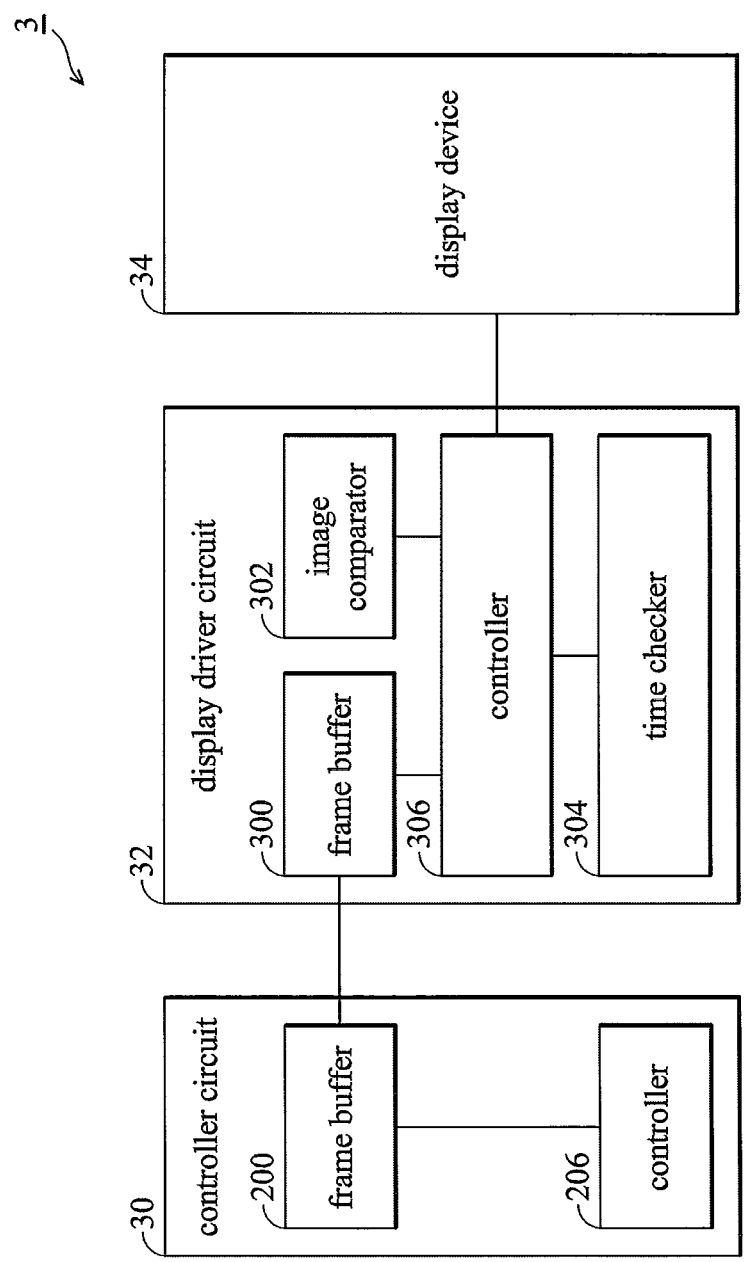
FIG. 3 is a block diagram of an exemplary display apparatus 3 according to another embodiment of the invention.

FIG. 3 is a block diagram of an exemplary display apparatus 3 according to another embodiment of the invention. The circuit configuration and circuit operation of the display apparatus 2 are identical to those in the display apparatus 2, except that the frame buffer 200, image comparator 202, and the time checker 204 are moved to the display driver circuit 32. The controller circuit 30 still comprises a frame buffer 200 therein to provide a data storage space to buffer the loaded image frame. The display controller 306 receives the new frame data $D_{i\_new}$ from the frame buffer 200 for storage in the frame buffer 300. The display buffer 300 may further comprise a base plane and a set of overlays that represent display content as a superposition on the base plane. The display controller 306 then moves the new frame data from the frame buffer 300 to the image comparator 302 for an image comparison, determines whether the received frame data is new according to the image difference detection result from the image comparator 302, determines whether the predetermined display refresh time has been reached, and refreshes the new frame data $D_{i\_new}$ to the display device 24 when a new frame data has been received or when the predetermined refresh time has been reached.

In some implementations, the controller circuit 30 is implemented by an integrated circuit, and may be, for example, a display driver in a mobile phone, a display device, or a computer. The circuitry connection and configuration is identical to that of the controller 20 in FIG. 2, thus, reference may be made to the preceding paragraphs and will not repeated here for brevity.

The display apparatus 3 refreshes the display device 24 according to a display refresh rate or new frame data determination, thereby providing a dynamic frame refresh mechanism for the display device 24.

Figure 4:
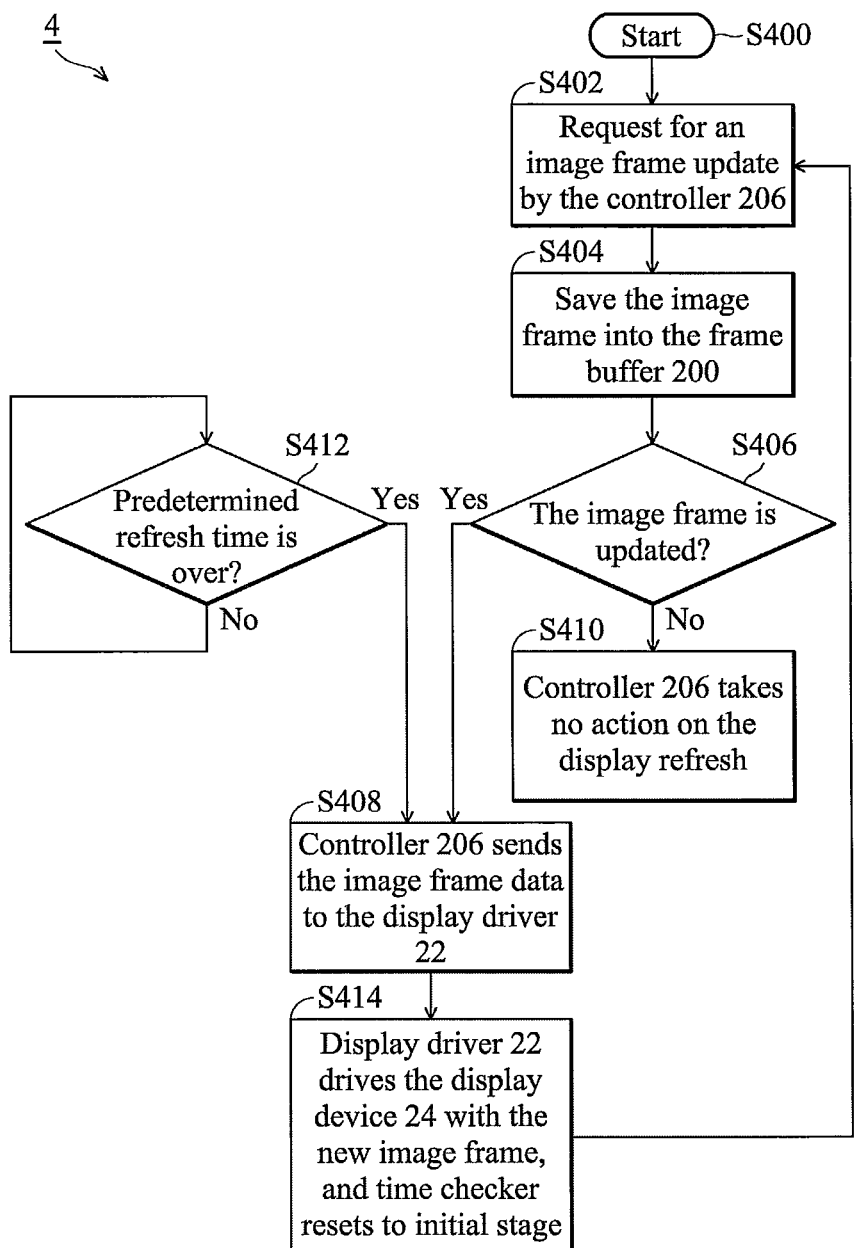
FIG. 4 is a flowchart of an exemplary display refresh method 4 according to an embodiment of the invention.

FIG. 4 is a flowchart of an exemplary display refresh method 4 according to an embodiment of the invention, incorporating the display apparatus 1 in FIG. 1.

Any time when the display device 24 is active and the controller 206 requests to update a display image frame from the internal or external image sources (S402), the controller 206 receives and saves the new image frame data $D_{i\_new}$ from the internal or external image sources to the frame buffer 200(S404). Upon reception of the new image frame data $D_{i\_new}$, the image comparator 202 compares the partial or full new image frame data $D_{i\_new}$ with the previous image frame data $D_{i\_pre}$ to determine any differences therebetween (S406). If a difference is detected, the controller 206 determines that an updated image has been received and sends the new image frame data $D_{i\_new}$ to the display driver circuit 22 (S408). If no difference is detected, the controller 206 takes no action to update the image frame data and refresh the display device 24 (S410). Concurrently, the time checker 204 counts the time to determine whether the predetermined display refresh time has been reached (S412). If so, the controller 206 renews the image frame data by sending the image data $D_{i\_new}$ from the frame buffer 200 to the display driver circuit 22 (S408). If not so, the time checker 204 continues counting the time (S412). Upon receiving a complete new frame data $D_{i\_new}$, the display driver circuit 22 drives the display device 24 using the new image data $D_{i\_new}$ (S414), thereby completing the display refresh procedure 4 (S416). After the display refresh procedure (S414) is done, the time checker 204 resets its timer and restarts to count the next refresh time immediately.

In some implementations, the display refresh method 4 is carried out in an integrated circuit in a mobile device that comprises the controller circuit 20 in FIG. 2. The display refresh method 4 comprises transmitting a first image data to a display device, determining whether a second image data has been received (S406), determining whether a refresh time is expired (S412), transmitting the second image data to the display device when the second image data has been received, and transmitting the first image data to the display device when the refresh time is expired (S408). In some implementations, the controller 206 sends request messages requesting for the first and second image data to a service network, and, in response, receives the first and second image data to be retained in the frame buffer 200.

In some implementations, the determining whether the second image data has been received step (S406) comprises comparing the second image data with the first image data, and determining that the second image data has been received when the second image data is different from the first image data.

In some implementations, the determining whether a refresh time is expired step (S412) comprises counting, by a timer, the refresh time. In some embodiments, the display refresh method 4 may further comprise resetting the timer after the refresh time is expired. The display refresh method 4 may comprise setting up the refresh time according to a supported refresh rate of the display device.

The display refresh method 4 offers a means to refresh the display device 24 not by a fixed refresh rate, but a dynamic refresh rate determined by the event of a new data frame being transferred into the frame buffer or when the display refresh time has been received.

Figure 5:
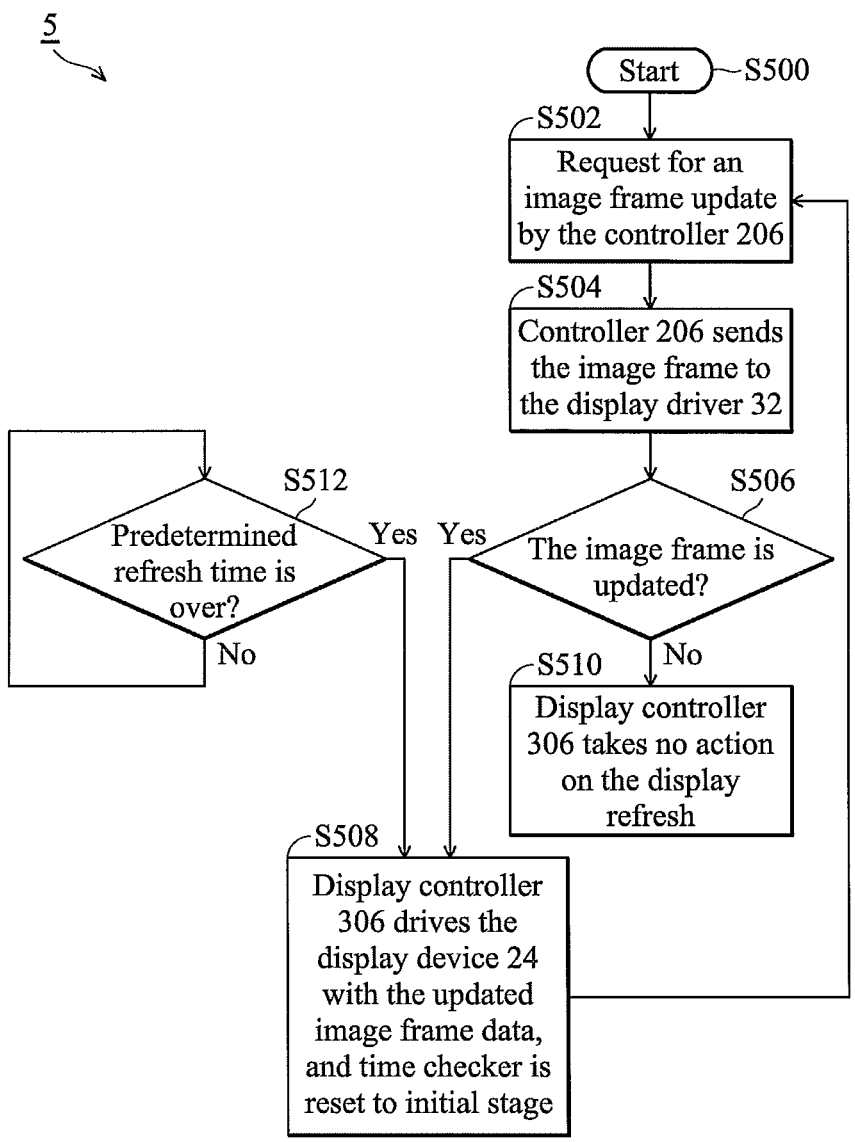
FIG. 5 is a flowchart of an exemplary display refresh method 5 according to another embodiment of the invention.

FIG. 5 is a flowchart of an exemplary display refresh method 5 according to another embodiment of the invention, incorporating the display apparatus 3 in FIG. 3. Steps S500-S502, S506-S514 are identical to Steps S400-S402, S406-S416, except that Steps S404-S416 are performed in the controller circuit, while the Step S504-S514 are carried out in the display driver circuit. Accordingly, reference to the preceding explanation for FIG. 4 can be made for corresponding detailed descriptions. Step S504 is different from the Step S404, where the controller circuit 30 sends the image frame data from the frame buffer 200 to the frame buffer 300 in the display driver circuit 32. Then the display driver circuit 32 carries out Steps S506-S514 to refresh the display device 34 when a new image frame is received by the frame buffer 300, or when the predetermined refresh time has been reached. After the display refresh procedure (S508) is done, the time checker 304 resets its timer and restarts to count the next refresh time immediately.

Similar to the method 4, the display refresh method 5 provides a means to refresh the display device 24 by a dynamic refresh rate determined by the event of a new data frame coming into the frame buffer or when the display refresh time has arrived, and can be carried out by the display driver circuit 32.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A display apparatus, comprising:
   a frame buffer for retaining a plurality of image frames to be displayed;
   a controller circuit, coupled to the frame buffer, for determining whether a change in the image frames has occurred and whether a refresh time is expired; and
   a display driver circuit, operatively coupled to the frame buffer and adapted to couple to an active display device, for receiving the image frames to be displayed from the frame buffer and dynamically refreshing the active display device when the change is determined or when a refresh time is expired, wherein the frame buffer is operative to retain a first image data and a second image data, and the controller circuit is operative to transmit the first image data to the display driver circuit when the refresh time is expired and to transmit the second image data to the display driver circuit when the second image data is received.

2. The display apparatus of claim 1, wherein the frame buffer is further configured to retain an original image frame and a newly downloaded image frame, and the controller circuit determines that the change has occurred when the original image frame and the newly downloaded image frame are at least partially different.

3. The display apparatus of claim 1, wherein the controller circuit is programmed with the refresh time corresponding to a refresh rate of the active display, and the refresh rate is lower than a frame rate at which image frames are written into the frame buffer.

4. The display apparatus of claim 3, wherein the refresh rate of the active display device is a fixed display refresh rate determined based on current leakage characteristics of the active display device.

5. The display apparatus of claim 1, wherein the controller circuit is operative to instruct the display driver circuit to refresh the active display device.

6. The display apparatus of claim 1, wherein the display driver refreshes the active display device by driving the active display to display image frames transmitted from the controller circuit.

7. The display apparatus of claim 1, wherein the display driver circuit is further configured to:
move and retain from the frame buffer an original image frame and a newly downloaded image frame, and
determine that the change has occurred when the original image frame and the newly downloaded image frame are at least partially different.

8. The display apparatus of claim 7, wherein the display driver circuit is embedded with a secondary frame buffer for retaining the original image frame and the newly downloaded image frame.

9. The display apparatus of claim 8, wherein the display driver circuit is programmed with the refresh time corresponding to a refresh rate of the active display, and the refresh rate is lower than a frame rate at which image frames are written into the frame buffer.

10. An integrated circuit, comprising:
a frame buffer, configured to retain a first image data and a second image data; and
a controller, coupled to the frame buffer and a transceiver, configured to determine whether a second image data is received and whether a refresh time is expired;
wherein the transceiver is further configured to transmit the second image data to the display device when the second image data is received by the frame buffer and transmit the first image data to the display device when the refresh time is expired.

11. The integrated circuit of claim 10, further comprising a transceiver, configured to transmit the first image data to a display device 12. The integrated circuit of claim 10, further comprising a comparator, coupled to the frame buffer, configured to compare the second image data with the first image data;
wherein the controller is configured to determine that the second image data is received when the second image data is different from the first image data.

13. The integrated circuit of claim 10, further comprising a timer, configured to count the refresh time.

14. The integrated circuit of claim 13, wherein the controller is configured to reset the timer after the refresh time is expired.

15. The integrated circuit of claim 10, wherein the controller is further configured to set up the refresh time according to a supported refresh rate of the display device.

16. The integrated circuit of claim 10, wherein the transceiver further sends request messages requesting for the first and second image data to a service network.

17. A method performed by a display apparatus, comprising:
retaining a plurality of image frames to be displayed in a frame buffer;
determining whether a change in a pair of image frames to be displayed consequently has occurred;
counting a refresh time; and
dynamically refreshing the active display device when the change is determined or when the refresh time is expired, wherein the frame buffer is operative to retain a first image data and a second image data, and the first image data is transmitted to the display driver circuit when the refresh time is expired and the second image data is transmitted to the display driver circuit when the second image data is received.

18. The method of claim 17, wherein the determining whether the second image data has been received step comprises comparing the second image data with the first image data, and determining that the second image data is received when the second image data is different from the first image data.

19. The method of claim 17, wherein the determining whether a refresh time is expired step comprises counting, by a timer, the refresh time.

20. The method of claim 19, further comprising resetting the timer after the refresh time is expired.

21. The method of claim 17, further comprising setting up the refresh time according to a supported refresh rate of the display device.

22. The method of claim 17, further comprising sending request messages requesting for the first and second image data to a service network.

\* \* \* \* \*